United States Patent
Gleich et al.

[11] Patent Number: 5,547,161
[45] Date of Patent: Aug. 20, 1996

[54] BASE FOR MACHINES AND THE LIKE

[75] Inventors: Werner Gleich, Leitershofen; Fritz D. Rothacker, Stuttgart; Dieter Brückel, Kaufbeuren; Eduard Schmid, Untermeitingen, all of Germany

[73] Assignee: Böwe Systec AG, Augsburg, Germany

[21] Appl. No.: 302,717

[22] PCT Filed: Mar. 3, 1993

[86] PCT No.: PCT/EP93/00480

§ 371 Date: Sep. 9, 1994

§ 102(e) Date: Sep. 9, 1994

[87] PCT Pub. No.: WO93/18336

PCT Pub. Date: Sep. 16, 1993

[30] Foreign Application Priority Data

Mar. 9, 1992 [DE] Germany .............................. 9203100 U

[51] Int. Cl.⁶ ............................. F16M 13/00; F16M 5/00
[52] U.S. Cl. ....................... 248/678; 248/345.1; 211/191
[58] Field of Search ................................. 248/676, 677, 248/345.1; 211/186, 191, 189; 312/265.4, 265.6, 265.1

[56] References Cited

U.S. PATENT DOCUMENTS

| | | | |
|---|---|---|---|
| 3,202,296 | 8/1965 | Diack | 211/186 X |
| 3,513,606 | 5/1970 | Jones | 211/189 X |
| 3,677,416 | 7/1972 | Block et al. | 211/186 |
| 4,493,425 | 1/1985 | Yoshida | 211/189 |
| 4,585,131 | 4/1986 | Crossman et al. | 211/189 X |
| 5,048,995 | 9/1991 | Beaulieu | 403/257 X |

FOREIGN PATENT DOCUMENTS

| | | | |
|---|---|---|---|
| 2304020 | 10/1976 | France . | |
| 2165203 | 7/1973 | Germany . | |
| 2324919 | 12/1974 | Germany | 312/265.4 |
| 7606588 | 7/1976 | Germany . | |
| 3028763 | 2/1981 | Germany . | |
| 8138352 | 9/1982 | Germany . | |
| 3447791 | 7/1986 | Germany . | |
| 8703695 | 12/1987 | Germany . | |
| 8811309 | 10/1988 | Germany . | |
| 8903814 | 5/1989 | Germany . | |
| 9106380 | 7/1991 | Germany . | |
| 665702 | 5/1988 | Switzerland . | |
| 718222 | 11/1954 | United Kingdom | 211/186 |
| 1494407 | 12/1977 | United Kingdom . | |

*Primary Examiner*—Karen J. Chotkowski
*Attorney, Agent, or Firm*—McGlew and Tuttle, P.C.

[57] ABSTRACT

The invention relates to the construction and arrangement of wall components which are to be attached to the posts and spars of a basic frame for machines, instruments, equipment and the like. These wall components extend from the middle of one post to the middle of another and are supported on the upper faces of the posts and the spars between them by their folded upper web. The side edges of the web extend to approximately the middle of the face of the post and then run obliquely inwards. A section covering the posts at the top is recessed where the web is supported. Running around the inside edge of the wall component there is a frame-like spacer, the depth of which determines the distance by which the outer wall of the wall component projects beyond the outside of the post.

11 Claims, 4 Drawing Sheets

BASE FOR MACHINES AND THE LIKE

FIELD OF THE INVENTION

The present invention pertains to a base for machines, devices, scaffolds and the like, in which posts and struts made of extruded light-metal sections are assembled into a three-dimensional framework and are connected to wall elements, wherein the post front surfaces facing upward are closed by cover sections, e.g., those made of plastic.

BACKGROUND OF THE INVENTION

Such bases and extruded light-metal sections have become known from the 1989 issue of the "MB System" complete catalog of ITEM GmbH, Solingen. The extruded sections have a square cross section and have, on their side surfaces, grooves of an undercut design, which are intended for the introduction of fasteners. In the core area, the prior-art section has a continuous cylindrical channel, which is intended for screwing in fasteners on the front side.

Such extruded light-metal sections can be assembled into a three-dimensional framework, in which the problem is how the free spaces remaining between the posts and struts are to be covered. Wall elements, which have fittingly designed connecting elements at their edges, in order to be inserted into the grooves extending along and on the posts and struts, have been developed for this purpose. The consequence of this is the arrangement of the wall elements in the space circumscribed by the posts and the frame. However, this makes the mounting and the removal of such wall elements complicated, because these can be displaced, together with their connecting elements, only along the grooves of the posts and struts, which is not readily possible without disassembly in a finished framework. As a consequence of this, the wall elements must be detached from their fasteners to lift them off vertically from the framework, in order to avoid this disassembly. This measure is also impractical and cumbersome especially when the base for machines and devices, in which repeated removal of the wall elements during assembly is often indispensable, is to be formed with the framework.

SUMMARY AND OBJECTS OF THE INVENTION

The basic task of the present invention is to simplify the design and the arrangement of wall elements for such a framework such that assembly and disassembly will be facilitated and the overall optical appearance is improved.

Based on the state of the art described in the introduction, the essence of the present invention is that the individual wall element has a width corresponding to the distance between the centers of adjacent posts; that it is in contact with the outer surfaces of the posts by means of space-forming members; and that it extends, with a bent upper web, over a partial area of the upper front surface of the post, and the cover section is recessed in this partial area.

The wall element according to the present invention can thus be attached to the posts and struts of the framework from the outside, and centering of the position in two directions is ensured by the fact that the individual wall element is in contact with the outside of the posts and struts and is supported on the upper front surface of the posts and of the upper strut. Lateral displacement of the wall element can be avoided by the peripheral edges of the bent upper web being guided at the recesses of the cover section. Centerings of another design are, of course, possible as well.

The wall element thus mounted can be fastened in the conventional manner. It is possible, e.g., to arrange centering pins, which engage corresponding centering holes of the framework during the attachment of the wall element, at the lower edge of the wall element. Bolts or other similar connecting elements, which can be easily closed and open, may be provided at the upper edge of the wall element in this case.

Thus, the advantage of the design according to the present invention is that the assembly and disassembly of the wall element can be carried out in a very simple manner, without disassembly of the framework. In addition, the overall optical appearance of the base or frame is improved, because the wall elements convexly project over the posts of the framework and make a narrow area of the posts visible, whereas all other surfaces of the framework are covered. A special overall aesthetic appearance, which is the prerequisite for special fittings, can be achieved by imparting different colors to the framework and to the wall elements.

Details of the present invention will become apparent from the subclaims and the exemplary embodiments.

The web attached to the wall element covers a portion of the end of an adjacent post. An edge of the web extends substantially perpendicularly from the front surface of the wall element to the center of the post. After this, it becomes a beveled edge which extends obliquely to an inward corner of the post. These features make it possible to connect such wall elements even at corner posts of the framework without a special change in shape. Only the cover sections of the posts have an adapted shape corresponding to the bevel of the edge of the bent upper web of the wall element. When two wall elements are connected at corner posts, the two bevelled edges will then be arranged in parallel and a cover can be used to place over the end of a corner post to fill a gap between the two parallel bevelled edges. However, as is shown by the exemplary embodiments, it is also conceivable to provide other designs of the cover sections, especially in the corner area of the framework.

The cover can have recesses in it where the webs cover the cover so that the surface of the cover not covered by the web will be flushed with the surface of the web. It is advantageous for the surfaces of the bent web as well as of the cover sections to be flush with one another. This requires the wall thickness of the wall element to be smaller than the wall thickness of the plate of the cover section covering the front surface of the post. This makes it possible to provide a depression corresponding to the wall thickness of the wall element in the surface of the cover section.

The web also covers the strut that extends between two posts. The web has a bent web projection which hooks over the back of the strut or the side of the strut opposite the wall element. The side of the wall element that is adjacent to the post can have a bent lateral edge which fits into the grooves of the posts. This leads to an additional simplification of the centering of the individual wall elements at the posts and struts of the framework. The edge of the wall elements which are adjacent the posts can also have space forming members positioned adjacent this edge. These space forming members can also extend circumferentially along the edges of the wall element. Elastic material can be used to create these space forming members and as such they can then be used to seal between the wall elements and the posts. This offers the advantage that the distance between the outer surface of the wall element and the outer surface of the framework is determined by the dimension of the space-forming members, which also provide for the sufficient sealing and contact of the individual wall elements on the framework, as well as for sound insulation.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
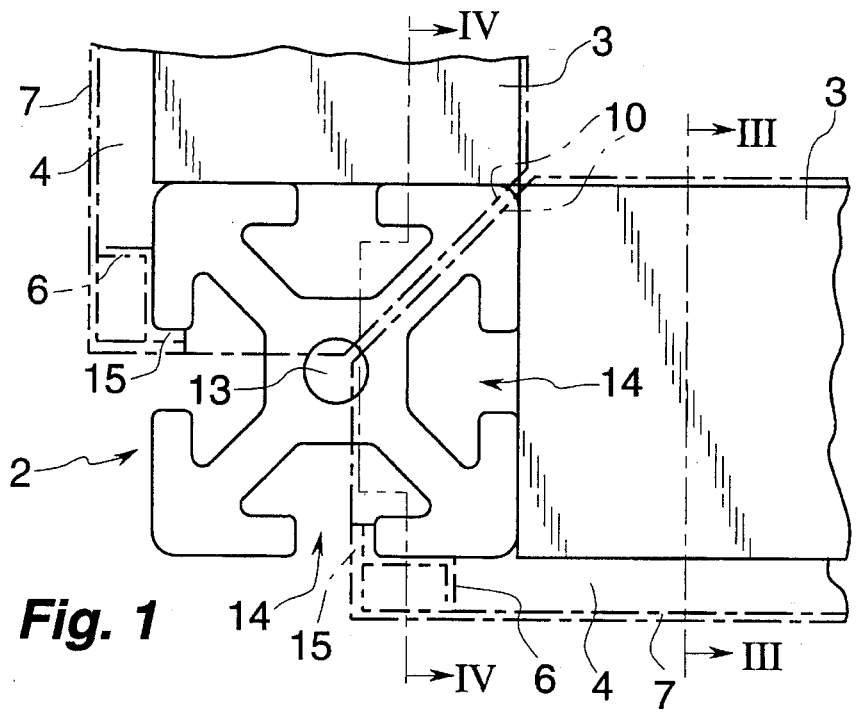
FIG. 1 shows a top view of a corner of a framework.

The corner design is shown symbolically in the exemplary embodiment shown in FIG. 1. The corner is composed, as is known, of posts 2 and struts 3, which consist of extruded light-metal sections and have a basic cross section as is shown for the post 2.

The posts 2 and the struts 3 have grooves 14 of undercut design, which are intended to accommodate suitable connection means. The grooves 14 are arranged as continuous grooves, so that the position at which a the strut 3 can be attached to the post 2 can be determined as desired. In addition, cross section of the post 2 and of the strut 3 has in its center a continuous, cylindrical channel 13, which is suitable for accommodating self-tapping screws. The design of the cross section of the posts 2 and the struts 3 may be modified in many different ways.

The wall elements 4, which can be connected to the posts 2 and the struts 3, are shown only by dash-dotted lines in FIG. 1. It shall be shown here that the individual wall element 4 has, on its inner side, space-forming members or means 6, which are arranged circumferentially, and ensure that the outer wall or surface 7 of the individual wall element 4 convexly projects over the outer surface of the post 2 and the strut 3.

A circumferential, hollow frame 6 may be formed from, e.g., sheet metal, and it may be permanently connected, e.g., welded, to the outer surface 7 of the wall element. However, it is also possible to form the space-forming members 6 as sealing elements consisting of an elastic material, which offers the advantage of sound insulation.

Figure 2:
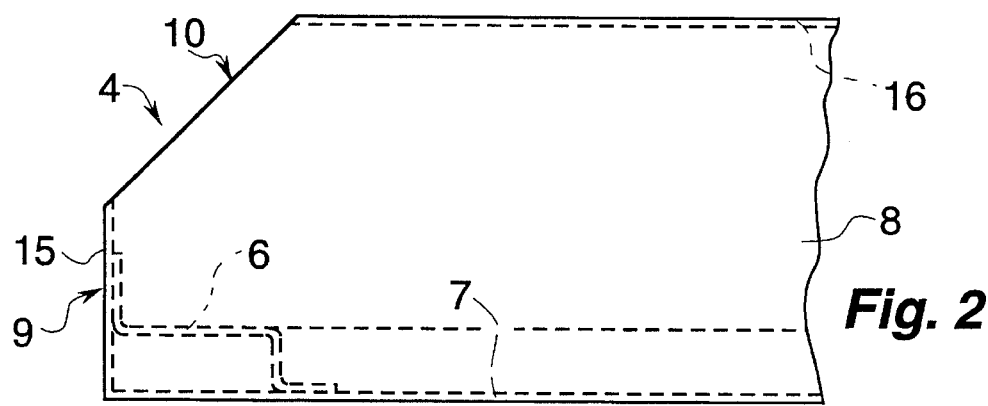
FIG. 2 shows a partial top view of a wall element.
Figure 4:
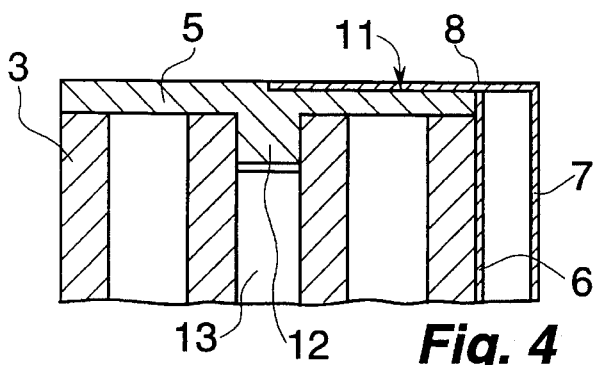
FIG. 4 shows a section along line IV—IV through the framework according to FIG. 1, FIGS. 5–10 show top views of different embodiments of the connection between wall elements and posts.
Figure 3:
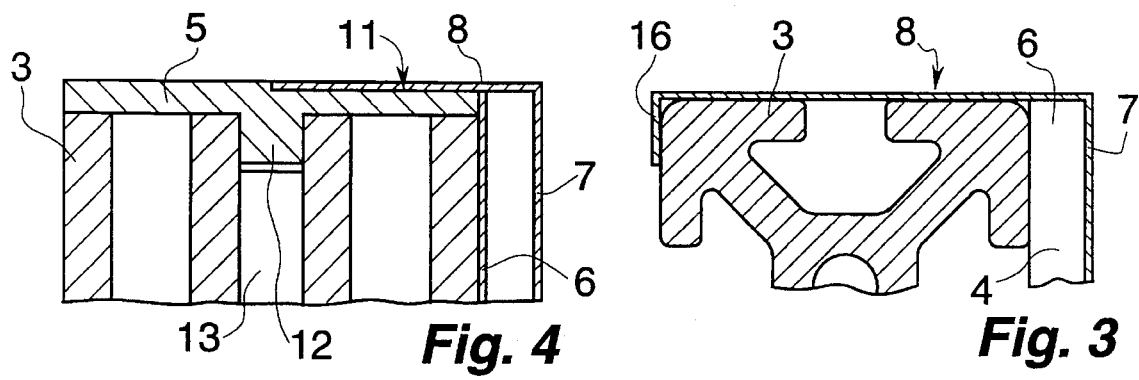
FIG. 3 shows a section along line III—III through the framework according to FIG. 1.

As is shown especially in FIGS. 2 through 4, the individual wall element 4 has a bent upper strut web 8 which forms a top edge and completely covers an upwardly facing surface of the strut 3 and partially covers an upper surface of the post 2 as shown on the horizontal strut in FIG. 1. The edge 9 of the bent upper web 8 extending at right angles to the outer surface 7 extends, as is indicated by the dash-dotted line in FIG. 1, approximately to the center of the post 2, and then it passes over into a beveled edge 10, which leads in the direction of the adjacent corner of the post 2. Thus, if two the wall elements 4 are attached in the area of a the corner-forming post 2 according to FIG. 1, the beveled edges 10 extend in parallel to one another in this exemplary embodiment.

The front surface of the post 2 is covered by a cover section 5, whose sectional view is shown in FIG. 4, and which has recesses 11 in the areas in which the bent upper web 8 of the wall element 4 lies. As is shown in FIG. 4, the recess 11 is so deep that the surfaces of the web 8 and of the cover section 5 extend flush with one another. The cover sections 5 have the same basic area as on end of the post 2. In addition, they are centered by a pin 12, which engages the channel 13, and they are fastened by clamping.

The width of the wall elements 4 is selected to be such that their edges 9 extend approximately to the center of the posts 2. The edges 9 can therefore be formed by edge webs 15, which centeringly engage the grooves 14 of the posts 2 and thus prevent the lateral displacement of the attached wall elements 4. The edge webs 15 may also be designed as sealing or sound-insulating elements.

It is also possible to provide the bent upper webs 8 with additional web projections 16, as is shown in FIG. 3. The web projections 16 surround the strut 3 and thus form a lock to prevent the detachment of the wall element 4 from the struts 3.

On the inside of its the outer surface 7, wall element 4 has space-forming members 6 in the form of a circumferential frame, as is shown in FIGS. 2 and 4. The height of the space-forming members 6 determines the distance between the outer surface 7 and the outer wall of the post 2. The members 6 may also be designed as sealing and sound-insulating means.

If the outer surface of the posts 2 is prepared in another color than the outer surface of the cover sections 5, a grid-like structure of the base or frame 1, which is particularly suitable for marking or fitting, is obtained because of the narrow surfaces of the posts 2 which are left open. The design aspects are the object of a separate registered design patent application.

FIGS. 5 through 10 show the different ways in which the wall elements 4 can be connected to the posts 2 and in which the cover sections 5 can be designed.

Figure 5:
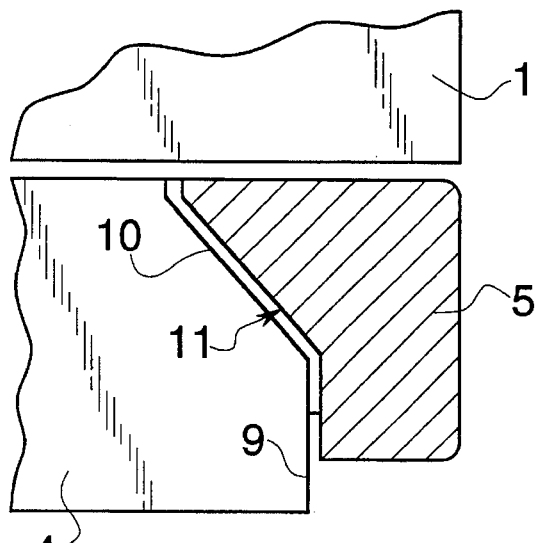

The exemplary embodiment in FIG. 5 shows a the wall element 4, which is to cover the post 2 on one side only. How the adjoining part of the frame 1 is to be designed is left open in this figure. Thus, the cover section 5 is provided only with a recess 11 corresponding to the edge 9 and to the beveled edge 10.

Figure 6:
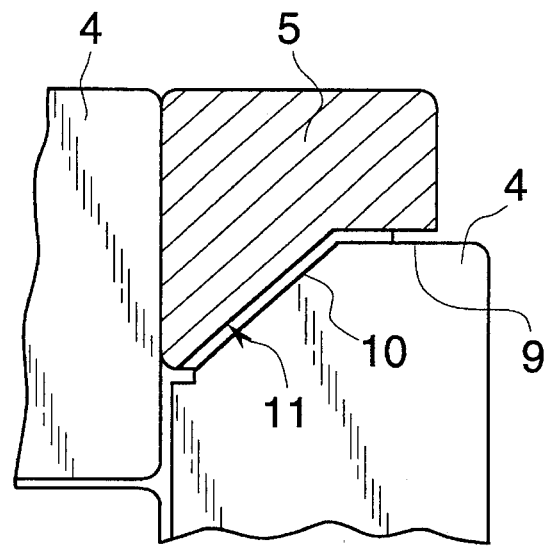

The example in FIG. 6 shows two the wall elements 4 arranged in the area of a corner post 2, in which the cover section 5 is designed in the same manner as in FIG. 5.

Figure 7:
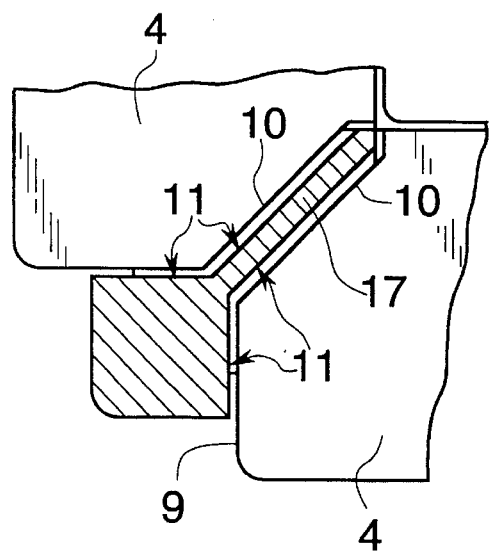

The exemplary embodiment according to FIG. 7 shows an aesthetically especially effective design of the corner connection of two the wall elements 4, in which the cover section 5 has two recesses 11 each, so that a web 17, which optically separates the oblique edges 10 of the wall elements 4 from one another, is left between the wall elements 4.

Figure 8:
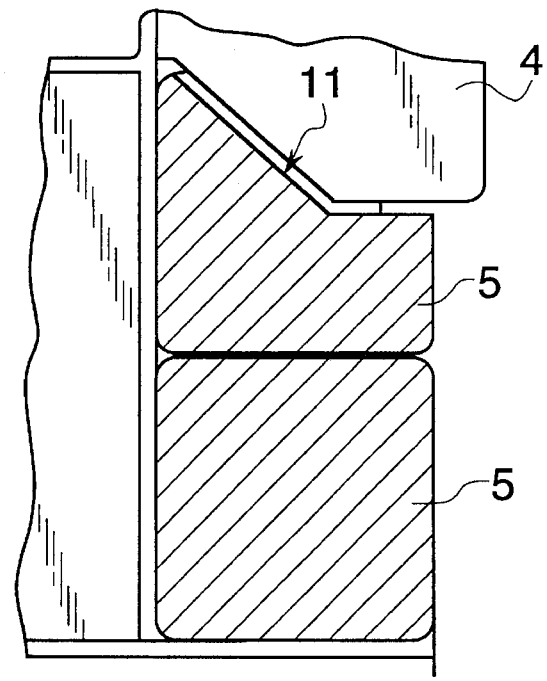

According to FIG. 8, it is also possible to bring about a greater distance between two the wall elements 4 placed diagonally by arranging two the posts 2 next to one another. One of the posts now has a cover according to FIG. 6, whereas the wall element 4 does not extend over the other post. The cover section 5 for the other post does not have a recess, but it is designed as a solid-web cover section, and it is left opened how the frame 1 is continued on this side.

Figure 9:
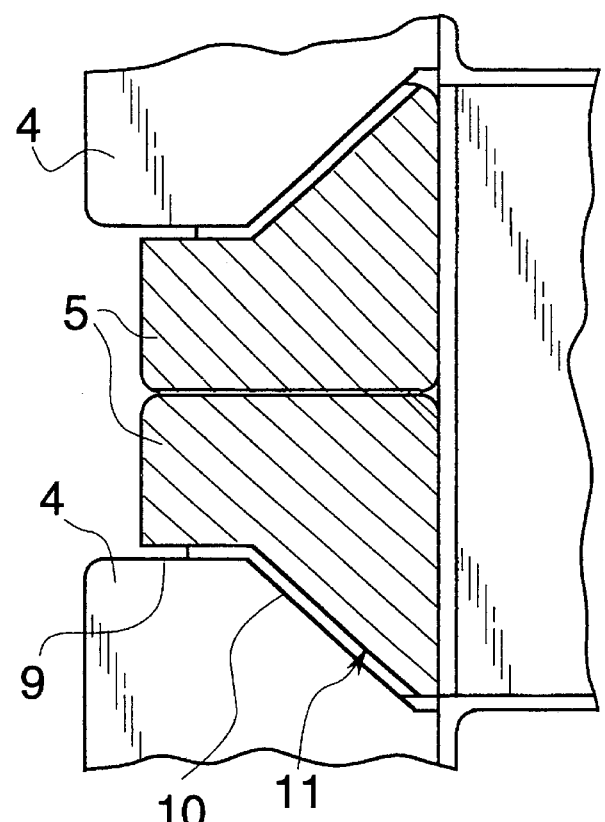
Figure 10:
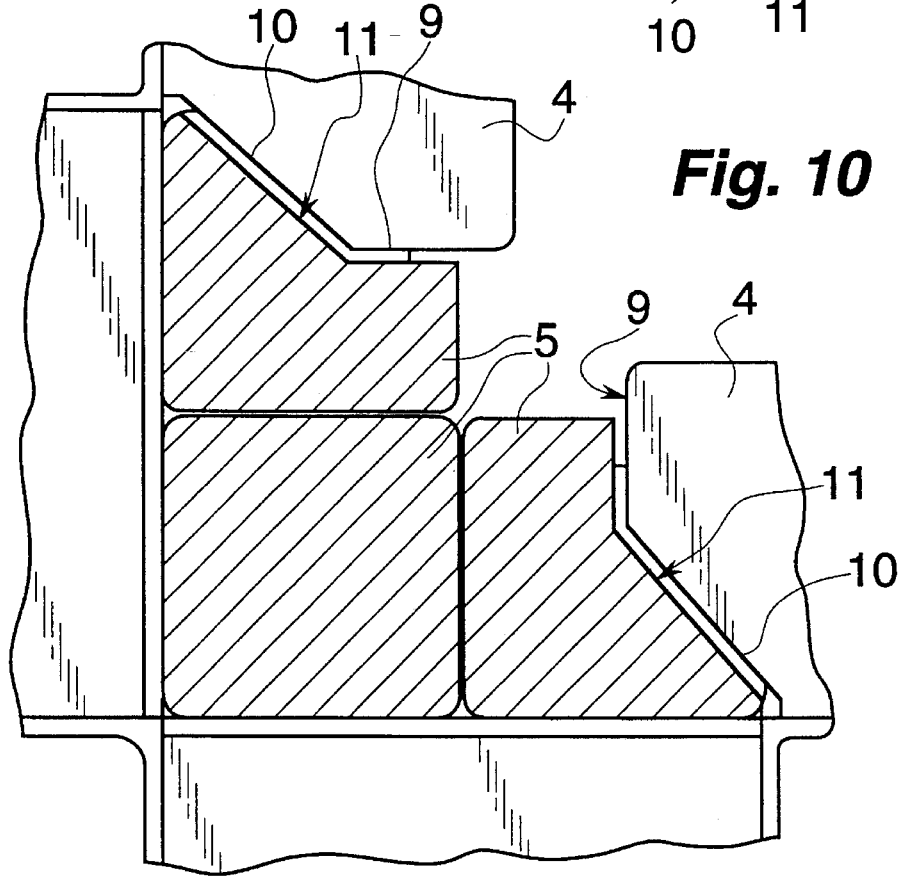
Figure 11:
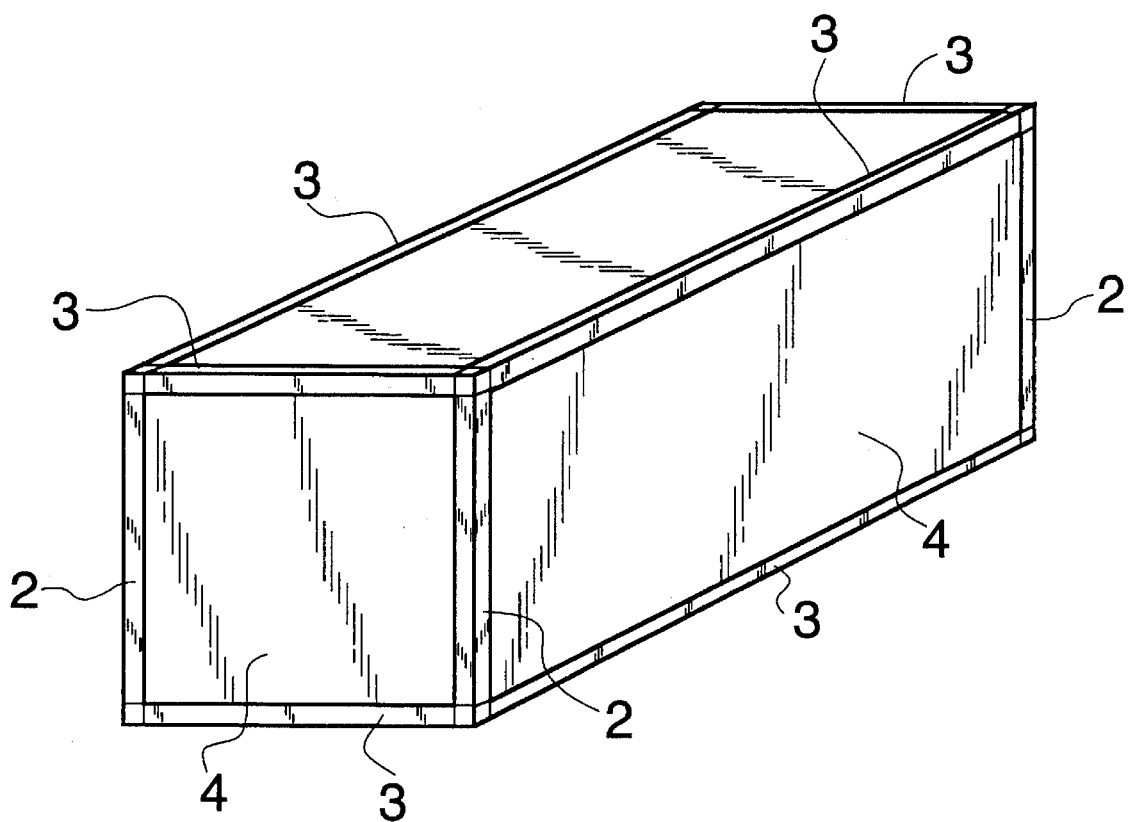
FIG. 11 is a view of the present invention assembled into a three-dimensional framework.

Two wall elements 4 are arranged in the same line or plane, and are positioned next to one another in the example according to FIG. 9. The cover sections 5 have only one recess corresponding to the edge 9 and to the bevel 10 of the wall element 4. The exemplary embodiment according to FIG. 10 shows a corner area of a the base 1, in which three the posts 2 are connected to one another. According to this embodiment, the center post has a the cover section 5 not provided with recesses, whereas the adjacent posts have the cover sections 5 corresponding to the designs according to FIG. 5. An especially prominent junction point, whose design depends on the design of the base, can thus be formed.

While specific embodiments of the invention have been shown and described in detail to illustrate the application of the principles of the invention, it will be understood that the invention may be embodied otherwise without departing from such principles.

LIST OF REFERENCE NUMERALS

1 Base
2 Post
3 Strut
4 Wall element
5 Cover section
6 Space-forming member
7 Outer wall
8 Bent upper edge
9 Wall
10 Beveled edge
11 Recess on cover section
12 Pin
13 Channel
14 Groove
15 Edge web
16 Web projection
17 Web of cover section

We claim:

1. Base for machines, devices, scaffolds and the like, comprising:

posts and struts formed of extruded light-metal sections, said posts and struts being assembled into a framework;

wall elements connected to said posts and struts;

cover sections closing upwardly facing post surfaces, each individual wall element having a width corresponding to a distance between centers of adjacent posts;

space-forming members for putting individual wall elements in contact with outer surfaces of said posts, a bent upper web extending from said individual wall element over a partial area of said upwardly facing post surfaces, said cover section being recessed in said partial area.

2. Base according to claim 1, wherein said bent upper web extends with an edge directed at right angles to a surface of said individual wall element, approximately to the center of the front surface of the post and extends obliquely inwardly to a corner of the front surface of the post.

3. Base according to claim 2, wherein adjacent wall elements are arranged at corner posts with obliquely inwardly extending web edges on said bent upper webs of said adjacent wall elements, said web edges being arranged in parallel to one another at spaced locations from one another, a narrow web of said cover section filling an intervening space.

4. Base according to claim 1, wherein surfaces of said web as well as said cover sections are flush with one another.

5. Base according to claim 1, wherein said web of said wall element surrounds said strut, located between two posts, with an additionally bent web projection.

6. Base according to claim 1, wherein said wall element extends with bent lateral edge webs of said posts.

7. Base according to claim 1, wherein said space forming members are designed as a frame extending circumferentially along edges of said wall element to form a physical unit with an outer wall of said wall element.

8. Base according to claim 1, wherein said space forming members are designed as sealing sections made of an elastic material.

9. A base in accordance with claim 1, wherein:

said framework is three-dimensional.

10. A framework comprising:

a plurality of posts, each of said plurality of posts having ends;

a plurality of struts connected to said plurality of posts;

a wall element connected to said plurality of posts and struts, said wall element having a width corresponding to a distance between centers of adjacent said posts;

space forming means positioned on said wall element and for contacting said adjacent posts;

a strut web connected to said wall element and extending over an adjacent one of said plurality of struts, said strut web also extending over a portion of one of said ends of said adjacent post;

a cover positioned on said one end of said adjacent post, said cover defining a recess in said portion of said one of said ends of said adjacent post covered over by said strut web.

11. A base in accordance with claim 10, wherein:

said plurality of struts are connected to said plurality of posts to form a three dimensional framework.

* * * * *